United States Patent
Li et al.

(10) Patent No.: US 11,526,170 B2
(45) Date of Patent: Dec. 13, 2022

(54) METHOD FOR DETECTING SKIDDING OF ROBOT, MAPPING METHOD AND CHIP

(71) Applicant: AMICRO SEMICONDUCTOR CO., LTD., Guangdong (CN)

(72) Inventors: Yongyong Li, Guangdong (CN); Gangjun Xiao, Guangdong (CN)

(73) Assignee: AMICRO SEMICONDUCTOR CO., LTD., Guangdong (CN)

(*) Notice: Subject to any disclaimer, the term of this patent is extended or adjusted under 35 U.S.C. 154(b) by 176 days.

(21) Appl. No.: 16/649,145

(22) PCT Filed: Aug. 6, 2018

(86) PCT No.: PCT/CN2018/098912
§ 371 (c)(1),
(2) Date: Mar. 20, 2020

(87) PCT Pub. No.: WO2019/085567
PCT Pub. Date: May 9, 2019

(65) Prior Publication Data
US 2020/0293048 A1  Sep. 17, 2020

(30) Foreign Application Priority Data
Oct. 30, 2017  (CN) .......................... 201711036010.0

(51) Int. Cl.
*G05D 1/02*  (2020.01)

(52) U.S. Cl.
CPC ... *G05D 1/0212* (2013.01); *G05D 2201/0217* (2013.01)

(58) Field of Classification Search
CPC combination set(s) only.
See application file for complete search history.

(56) References Cited

U.S. PATENT DOCUMENTS 5,400,244 A * 3/1995 Watanabe ............ G05D 1/0242
180/404
7,211,980 B1 * 5/2007 Bruemmer ........... G05D 1/0246
318/567

(Continued)

FOREIGN PATENT DOCUMENTS

CN  103679301 A  3/2014
CN  103914068 A  7/2014

(Continued)

OTHER PUBLICATIONS

CN 105509729 A. English translation of description. Apr. 20, 2016. (Year: 2016).*

(Continued)

*Primary Examiner* — Jeff A Burke
*Assistant Examiner* — Madison B Emmett
(74) *Attorney, Agent, or Firm* — Gang Yu

(57) ABSTRACT

The disclosure relates to a method for predicting and controlling robot walking. The method includes the following steps: constructing a grid map based on grid units marked with a status; establishing a dynamic detection model with a current location of a robot as a reference point based on the grid map; predicting a forward path condition of the robot based on the dynamic detection model; and controlling a walking mode of the robot based on the prediction result.

11 Claims, 2 Drawing Sheets

(56) References Cited

U.S. PATENT DOCUMENTS

2010/0263142 A1* 10/2010 Jones .................. A47L 11/00
    15/21.1
2012/0173018 A1    7/2012  Allen et al.
2014/0005933 A1* 1/2014 Fong .................. G05D 1/0088
    701/447

FOREIGN PATENT DOCUMENTS

| CN | 105182979 A | 12/2015 |
|---|---|---|
| CN | 105509729 A | 4/2016 |
| CN | 105955262 A | 9/2016 |
| CN | 107807643 A | 3/2018 |
| JP | 2005310043 A | 11/2005 |
| JP | 2007148591 A | 6/2007 |
| JP | 2008009927 A | 1/2008 |
| KR | 20080093580 A | 10/2008 |
| KR | 20120049927 A | 5/2012 |
| WO | 2011074165 A1 | 6/2011 |
| WO | 2016067640 A1 | 5/2016 |

OTHER PUBLICATIONS

Wikipedia. "Cartesian coordinate system". Sep. 19, 2017. (Year: 2017).*
Wikipedia. "Rotation of axes". Aug. 1, 2017. (Year: 2017).*
Wikipedia. "List of trigonometric identities". Oct. 15, 2017. (Year: 2017).*
Wikipedia. "Vector projection". Sep. 15, 2017. (Year: 2017).*
Gene Eu Jan et. al. "A new maze routing approach for path planning of a mobile robot", Advanced Intelligent Mechatronics, 2003. AIM 2003. Proceedings. 2003 I EEE/ASME International Conference on Jul. 20-Jul. 24, 2003, Piscataway, NJ, USA, IEEE, vol. 1, Jul. 20, 2003, pp. 552-557, XP010654537, ISBN: 978-0-7803-7759-2.

* cited by examiner

"METHOD FOR DETECTING SKIDDING OF ROBOT, MAPPING METHOD AND CHIP

CROSS-REFERENCE TO RELATED APPLICATIONS

The disclosure claims priority to Chinese Patent Application No. 201711036010.0 entitled "Robot Walking Prediction and Control Method", filed on Oct. 30, 2017, the contents of which are hereby incorporated by reference in their entirety.

TECHNICAL FIELD

The embodiments of disclosure relate to the field of robots, and more particularly, to a method for predicting and controlling robot walking.

BACKGROUND

Currently, robots predict whether there are obstacles in front by generally requiring infrared detection, while dangerous regions or cliffs can only be detected visually. These modes require increased hardware costs. However, if there are no predictions about the front condition, there are many situations that may lead to worse results. For example, for a dangerous region where a robot has entered, the robot will enter it again due to no predictions, so it is very unintelligent. There are also cliffs. If there are no predictions, when the speed of the robot is relatively high, the robot may rush over and fall off.

SUMMARY

A method for predicting and controlling robot walking includes the following steps. A grid map is constructed based on grid units marked with a status. A dynamic detection model is established with a current location of a robot as a reference point based on the grid map. A forward path condition of the robot is predicted based on the dynamic detection model. A walking mode of the robot is controlled based on the prediction result.

DETAILED DESCRIPTION OF THE EMBODIMENTS

The Detailed Description of the Embodiments of the disclosure is further described below with reference to the accompanying drawings.

The robot described in the disclosure is an intelligent household appliance, which can automatically walk on certain occasions by virtue of certain artificial intelligence. A robot body is equipped with various sensors that may detect a walking distance, a walking angle, a body status, an obstacle and the like. If encountering a wall or other obstacles, it will turn on its own and walk in different routes according to different settings for planned walking. The mobile robot according to the disclosure includes the following structure: a robot body capable of autonomous walking with driving wheels. A human-machine interaction interface is provided on the body, and an obstacle detection unit is provided on the body. There is an inertial sensor inside the body. The inertial sensor includes an accelerometer and a gyroscope. The driving wheel is provided with an odometer (usually a code disk) for detecting the driving distance of the driving wheel. A control module capable of processing parameters of related sensors and outputting a control signal to an execution member is also provided.

Figure 1:
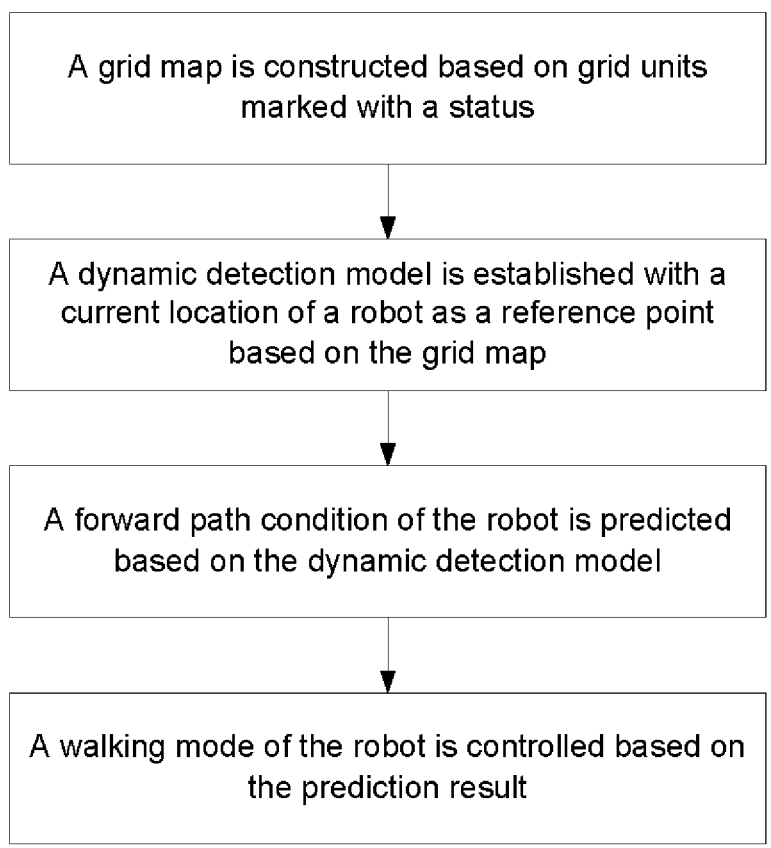
FIG. 1 is a flowchart of a method for predicting and controlling robot walking according to the disclosure.

As shown in FIG. 1, a method for predicting and controlling robot walking of the disclosure includes the following steps. A grid map is constructed based on grid units marked with a status. A dynamic detection model is established with a current location of a robot as a reference point based on the grid map. A forward path condition of the robot is predicted based on the dynamic detection model. A walking mode of the robot is controlled based on the prediction result. The grid units marked with a status refers to that a grid unit where a robot has normally walked is marked as a walked unit, a grid unit where the robot detects an obstacle is marked as an obstacle unit, a grid unit where the robot detects a jam or slip is marked as a dangerous unit, a grid unit where the robot detects a cliff is marked as a cliff unit, and a grid unit where the robot has not walked is marked as an unknown unit. Wherein, the grid unit where the robot has normally walked refers to that the robot will not encounter abnormal conditions such as slipping, jamming, hitting an obstacle, or overhanging a cliff when passing through the grid unit. The abnormal conditions will make errors in robot walking and even damage the robot. When the robot walks normally, it will walk smoothly and orderly at a predetermined speed and direction. According to the method of the disclosure, based on a grid map (the grid map is a map constructed and saved after the robot has previously traversed all regions) composed of grid units marked with different statuses, robot can quickly and accurately predict a forward path condition through a dynamic detection model during a walking process, and thus the walking mode of the robot can be reasonably controlled according to different path conditions, so as to avoid problems such as the robot falling off a cliff or repeatedly entering a dangerous region, thereby improving walking efficiency of the robot.

Figure 2:
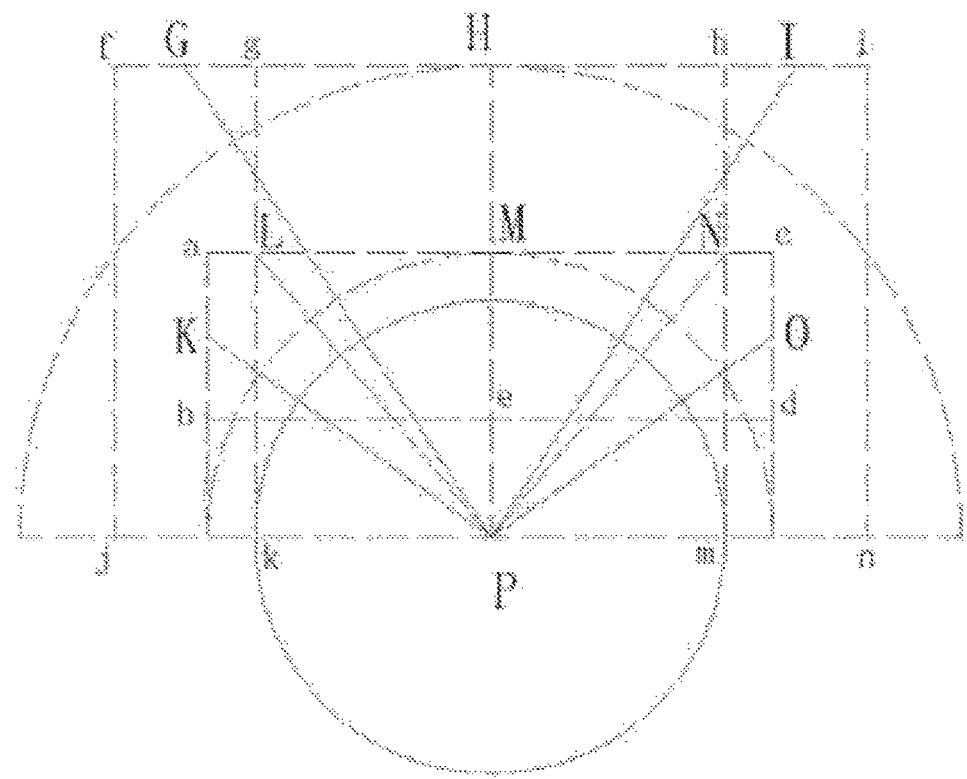
FIG. 2 is a schematic diagram of a dynamic detection model according to the disclosure.

Preferably, the step that a dynamic detection model is established with a current location of a robot as a reference point includes the following steps. By using the reference point as a circle center, a first arc line is constructed with a first length as a radius, and a second arc line is constructed with a second length as a radius, wherein the first length is smaller than the second length. A region between the first arc line and the second arc line is determined as a first prediction region. A region outside the second arc line is determined as a second prediction region. A first prediction point, a second prediction point, a third prediction point, a fourth prediction point, and a fifth prediction point in the first prediction region are determined with a current direction of robot walking as a reference direction, the first prediction point is located in the reference direction, a line connecting the first prediction point with the circle center and the reference direction form a first angle, the second prediction point and the fourth prediction point are located on one side of the first prediction point, a line connecting the second prediction point with the circle center and the line connecting the first prediction point with the circle center form a second angle, a line connecting the fourth prediction point with the circle center and the line connecting the first prediction point with the circle center form a fourth angle, the third prediction point and the fifth prediction point are located on the other side of the first prediction point, a line connecting the third prediction point with the circle center and the line connecting the first prediction point with the circle center form a third angle, and a line connecting the fifth prediction point with the circle center and the line connecting the first prediction point with the circle center form a fifth angle. A sixth prediction point, a seventh prediction point and an eighth prediction point in the second prediction region are determined with a current direction of robot walking as a reference direction, the sixth prediction point is located in the reference direction, a line connecting the sixth prediction point with the circle center and the reference direction form a sixth angle, the seventh prediction point is located on one side of the sixth prediction point, a line connecting the seventh prediction point with the circle center and the line connecting the sixth prediction point with the circle center form a seventh angle, the eighth prediction point is located on the other side of the sixth prediction point, and a line connecting the eighth prediction point with the circle center and the line connecting the sixth prediction point with the circle center form an eighth angle. Wherein, the first length and the second length may be set according to actual conditions correspondingly. Preferably, the first length may be 1.1-1.5 times the radius of a robot body, and the second length may be 1.6-2.1 times the radius of the robot body. As shown in FIG. 2, the first prediction point is a point M, the second prediction point is a point L, the third prediction point is a point N, the fourth prediction point is a point K, the fifth prediction point is a point O, the sixth prediction point is a point H, the seventh prediction point is a point G, and the eighth prediction point is a point I. A point P is the reference point (that is, the circle center). The circle outside the point P represents the robot body. A semi-circular arc with a smaller inner diameter outside the circle is the first arc line. A semi-circular arc with a larger inner diameter outside the circle is the second arc line. Since a PM direction is the current direction of the robot (that is, the reference direction) and point M is in the reference direction, LMPM is the first angle with an angle value of 0°. Since point H is also in the reference direction, an angle value of the sixth angle ZHPM is also 0°. In addition, ZLPM is the second angle, ZNPM is the third angle, LKPM is the fourth angle, ZOPM is the fifth angle, LGPM is the seventh angle, and ZIPM is the eighth angle. The angle values of the angles may be set correspondingly according to an actual condition. Preferably, the angle value range of the second angle and the third angle is between 20° and 40°, the angle value range of the fourth angle and the fifth angle is between 45° and 65°, and the angle value range of the seventh angle and the eighth angle is between 15° to 40°.

Preferably, the first length is 1.2 times the radius of a robot body, and the second length is twice the radius of the robot body. The values of the first length and the second length should be suitable. If they are too small, when an abnormal condition such as a dangerous region or an obstacle is predicted, the robot will not be able to avoid or adjust the walking status, and the advantages brought by prediction will not be achieved. If they are too large, relatively more computing resources are consumed, resulting in insufficient efficiency brought by prediction.

Preferably, as shown in FIG. 2, the first prediction point is located at an intersection (that is, the point M in the figure) of the first arc line and the reference direction, the second prediction point is located at an intersection of a first perpendicular line and a first parallel line, the third prediction point is located at an intersection of the first perpendicular line and a second parallel line, the fourth prediction point is located within a first line segment in a third parallel line, and the fifth prediction point is located within a second line segment in a fourth parallel line.

Wherein the first perpendicular line is a perpendicular line (that is, a line ac in the figure) that passes through the first prediction point and is perpendicular to the reference direction, the first parallel line is a parallel line (that is, a line gk in the figure) that is located on one side of the reference direction, parallel to the reference direction and has a perpendicular distance from the reference direction by the radius of the robot body, the second parallel line is a parallel line (that is, a line hm in the figure) that is located on the other side of the reference direction, parallel to the reference direction and has a perpendicular distance from the reference direction by the radius of the robot body, the third parallel line is a parallel line (that is, a line ab in the figure) that is located on one side of the reference direction, parallel to the reference direction and has a perpendicular distance from the reference direction by the first length, the fourth parallel line is a parallel line (that is, a line cd in the figure) that is located on the other side of the reference direction, parallel to the reference direction and has a perpendicular distance from the reference direction by the first length, the first line segment is a line segment (that is, a line segment ab in the figure) from an intersection of the first perpendicular line and the third parallel line to an intersection of the second perpendicular line and the third parallel line, the second line segment is a line segment (that is, a line segment cd in the figure) from the intersection of the first perpendicular line and the third parallel line to the intersection of the second perpendicular line and the third parallel line, and the second perpendicular line is a perpendicular line (that is, a line bd in the figure) that is located between the first prediction point and the circle center, perpendicular to the reference direction and has a shortest distance from the circle center by half of the radius of the robot body. In the figure, the distance between point e and point P is half of the radius of the robot body. The point K may be set to any point in the line segment ab according to the actual condition. The point O may be set to any point in the line segment cd according to the actual condition.

Preferably, the sixth prediction point is located at an intersection (that is, the point H in the figure) of the second arc line and the reference direction, the seventh prediction point is located within a third line segment in a third perpendicular line, and the eighth prediction point is located within a fourth line segment in the third perpendicular line.

Wherein the third perpendicular line is a perpendicular line (that is, a line fi in the figure) that passes through the sixth prediction point and is perpendicular to the reference direction, the third line segment is a line segment (that is, a line segment fg in the figure) from an intersection of the first parallel line and the third perpendicular line to an intersection of the fifth parallel line and the third perpendicular line, the fourth line segment is a line segment (that is, a line segment hi in the figure) from an intersection of the second parallel line and the third perpendicular line to an intersection of the sixth parallel line and the third perpendicular line, the fifth parallel line is a parallel line (that is, a line fj in the figure) that is located on one side of the reference direction, parallel to the reference direction and has a perpendicular distance from the reference direction by a sum of half of a difference obtained by subtracting the first length from the second length and the first length, and the sixth parallel line is a parallel line (that is, a line (in) in the figure) that is located on the other side of the reference direction, parallel to the reference direction and has a perpendicular distance from the reference direction by a sum of half of the difference obtained by subtracting the first length from the second length and the first length.

The circuits described in the above embodiments are all virtual circuits, and are cited for the convenience of explaining the architecture of the dynamic detection model. In actual operation of the robot, the above circuits do not exist, but the robot predicts within the range of the model architecture.

Preferably, the step that a forward path condition of the robot is predicted based on the dynamic detection model includes the following steps. An XY-axis local coordinate system is established with a current location of the robot as a local coordinate origin and a current direction as a local Y-axis direction. Local coordinates in the XY-axis local coordinate system where the first prediction point to the eighth prediction point are located are converted into global coordinates in a corresponding XY-axis global coordinate system. The global coordinates are converted into grid coordinates. Statuses of grid units corresponding to the first prediction point to the eighth prediction point is determined based on the grid coordinates and a grid map. Only by converting the local coordinates of the prediction points of the dynamic detection model into global coordinates, the grid coordinates in the grid map can be corresponded. In this way, the robot can accurately predict the status of the grid unit in the front of the walking direction in the actual walking process.

Preferably, the step that local coordinates in the XY-axis local coordinate system where the first prediction point to the eighth prediction point are located are converted into global coordinates in a corresponding XY-axis global coordinate system includes the following steps. The global coordinates of the current location of the robot in the XY-axis global coordinate system are determined as (x, y). An angle between the current direction of the robot and the Y axis in the XY-axis global coordinate system is determined as θ. The local coordinates of the first prediction point in the XY-axis local coordinate system are determined as (x1, y1). A distance between a projection point where the first prediction point is projected to the X axis in the XY-axis global coordinate system and a projection point where the current location of the robot is projected to the X axis in the XY-axis global coordinate system is determined as xr1= (x1*cos θ−y1*sin θ). A distance between a projection point where the first prediction point is projected to the Y axis in the XY-axis global coordinate system and a projection point where the current location of the robot is projected to the Y axis in the XY-axis global coordinate system is determined as yr1=(x1*sin θ+y1*cos θ). The global coordinates of the first prediction point are determined as (xw1=x+xr1, yw1=y+yr1). The local coordinates of the second prediction point in the XY-axis local coordinate system are determined as (x2, y2). A distance between a projection point where the second prediction point is projected to the X axis in the XY-axis global coordinate system and the projection point where the current location of the robot is projected to the X axis in the XY-axis global coordinate system is determined as xr2=(x2*cos θ−y2*sin θ). A distance between a projection point where the second prediction point is projected to the Y axis in the XY-axis global coordinate system and the projection point where the current location of the robot is projected to the Y axis in the XY-axis global coordinate system is determined as yr2=(x2*sin θ+y2*cos θ). The global coordinates of the second prediction point are determined as (xw2=x+xr2, yw2=y+yr2). By analogy, the determination of the global coordinates of the eighth prediction point is completed.

Figure 3:
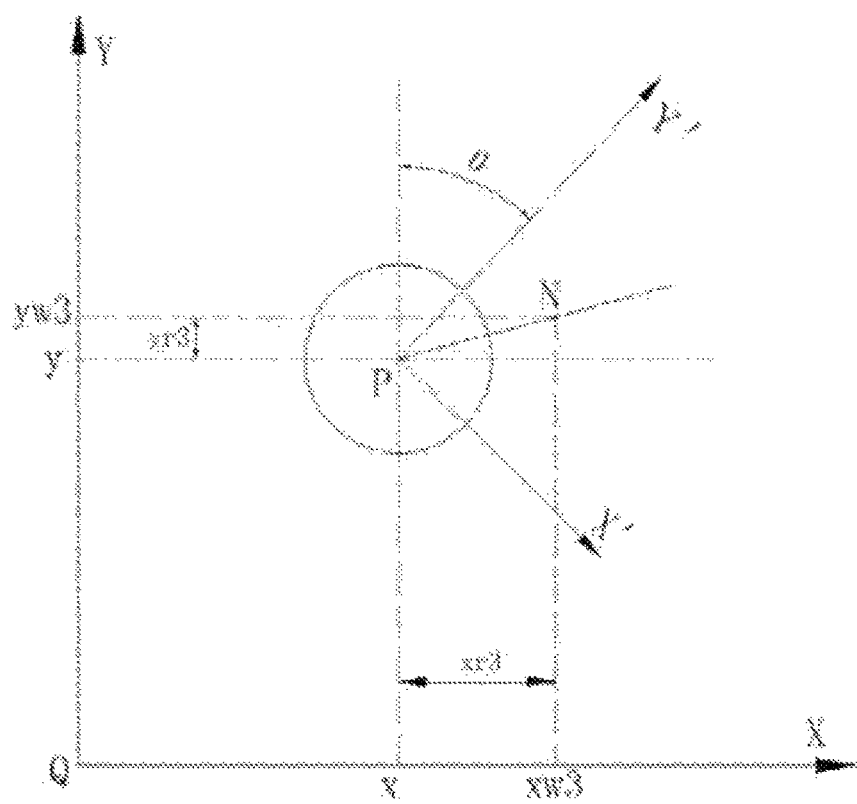
FIG. 3 is a schematic diagram of converting local coordinates into global coordinates according to the disclosure.

As shown in FIG. 3, an XQY coordinate system is an XY-axis global coordinate system. An X'PY' coordinate system is an XY-axis local coordinate system. The circle indicates a robot, and the point P is a current location of the robot, and is also used as an origin of a local coordinate system. Through detection data of sensors such as gyroscopes and odometers, the coordinate position of the point P in a global coordinate system is known. It is assumed to be (x, y). The PM direction is a current direction of the robot, and may be obtained from the detection data of the gyroscope. It is assumed that the angle of the current direction is 0 (that is, the angle between the PM direction and the Y-axis direction). The point N is the third prediction point of the dynamic detection model. Taking this point as an example, a method for converting local coordinates into corresponding global coordinates will be described. The local coordinates of the point N are (x3, y3). The angle between PM as the current direction and the Y axis is 8. When the point N is projected to the X axis direction, the shortest distance from the intersection of the X axis direction to the point P is xr3, and xr3=(x3*cos θ−y3*sin θ). The shortest distance from the intersection of the Y-axis direction to the point P is yr3, and yr3=(x3*sin θ+y3*cos θ). Then, as can be seen from the figure, the global coordinates of the point N are (xw3, yw3), xw3=x+xr3=x+x3*cos θ−y3*sine, yw3=y+yr3=y+x3*sin θ+y3*cos θ. In the dynamic detection model, the relative positions between the prediction points are fixed, so as the current direction of the robot changes, the rotation angles of the prediction points are the same. Therefore, each prediction point is converted into global coordinates in the same manner, and the other prediction points are converted in the same manner as the above point N. The descriptions are omitted herein.

Preferably, the step that the global coordinates are converted into grid coordinates includes the following steps. The grid unit is determined as a square with a side length of L. The grid coordinates of the first prediction point are determined as (xg1=xw1/L, yg1=yw1/L), and the results of xw1/L and yw1/L are rounded. The grid coordinates of the second prediction point are determined as (xg2=xw2/L, yg2=yw2/L), and the results of xw2/L and yw2/L are rounded. By analogy, the determination of the grid coordinates of the eighth prediction point is completed. Because the global coordinates cannot determine the path condition ahead, the path condition in the grid map is marked with the status of the grid unit. Therefore, it is necessary to convert the global coordinates into the corresponding grid unit, and then judge the status of the corresponding grid unit to finally determine the path condition ahead, so as to achieve the prediction effect. Through the above conversion mode, it is possible to accurately determine which grid unit corresponds to each prediction point in the dynamic detection model, and the operation is simple and accurate.

Preferably, the step that a walking mode of the robot is controlled based on the prediction result includes the following steps. It is judged whether a grid unit corresponding to the first prediction point, the second prediction point or the third prediction point is a dangerous unit. If yes, the robot is controlled to walk according to a first walking mode. If no, it is judged whether the grid unit corresponding to the first prediction point, the second prediction point or the third prediction point is a cliff unit or an obstacle unit. If yes, the robot is controlled to walk according to a second walking mode. If no, it is judged whether a grid unit corresponding to the fourth prediction point or the fifth prediction point is a cliff unit or an obstacle unit. If yes, the robot is controlled to walk according to a third walking mode. If no, it is judged whether a grid unit corresponding to the sixth prediction point, the seventh prediction point or the eighth prediction point is a cliff unit or an obstacle unit. If yes, the robot is controlled to walk according to a fourth walking mode. If no, a current walking mode of the robot is kept. Wherein the dangerous unit is a grid unit where the robot detects a jam or slip, the obstacle unit is a grid unit where the robot detects an obstacle, and the cliff unit is a grid unit where the robot detects a cliff. By gradually judging the status of the grid units corresponding to each prediction point from near to far, the path condition ahead is determined, so as to control the robot to walk in different ways, thereby improving the walking efficiency of the robot and avoiding the problems such as jamming or slipping, strong impacts on obstacles, or overhanging cliffs caused by entering a dangerous region.

Preferably, the step that the robot is controlled to walk according to a first walking mode includes the following steps. The robot is controlled to stop walking. It is judged whether the robot is in a bow-shaped walking phase. If yes, the robot is controlled to turn around. If no, it is determined that the robot is in the phase of walking sidewise, and the robot is controlled to continue to walk sidewise after bypassing the dangerous unit. And/or, the step that the robot is controlled to walk according to a second walking mode includes the following steps. If it is determined that the grid unit is an obstacle unit, the robot is controlled to reduce the walking speed by a first proportion. If it is determined that the grid unit is a cliff unit, the robot is controlled to reduce the walking speed by a second proportion. And/or, the step that the robot is controlled to walk according to a third walking mode includes the following steps. The robot is controlled to reduce the walking speed by a third proportion. And/or, the step that the robot is controlled to walk according to a fourth walking mode includes the following steps. The robot is controlled to reduce the walking speed by a fourth proportion. Wherein the proportions may be set according to actual conditions. Preferably, the first proportion is 0.5, the second proportion is 0.3, the third proportion is 0.7, and the fourth proportion is 0.8.

When it is determined that there are dangerous units in the three prediction points closest to the robot in the first prediction region, the robot needs to avoid the corresponding dangerous region. Avoiding the dangerous region needs to adopt different avoidance modes according to the walking stage of the robot. According to the walking mode of the floor sweeping robot, it is mainly divided into a bow-shaped walking phase and a sidewise walking phase. When the robot is in the bow-shaped walking phase, it can directly turn around when encountering a dangerous region, and continue bow-shaped walking to clean other paths. When the robot is in the sidewise walking phase, it cannot turn around because the sidewise path will be repeatedly cleaned after turning around, and if the dangerous region is detected again and the robot turns around again, a condition of repeated sidewise walking between two dangerous regions will be formed. Therefore, if encountering a dangerous region during the sidewise walking process, it is necessary to bypass the dangerous region and to continue walking sidewise after bypassing the dangerous region. In this way, the cleaning in all sidewise phases can be finally completed. When it is determined that there are no dangerous units in the three prediction points closest to the robot in the first prediction region, if there are obstacle units, the walking speed of the robot is reduced to 0.5 times, so as to prevent the robot from hitting obstacles too fast. If there is a cliff unit, the speed of the robot is reduced to 0.3 times, so that the speed of the robot is reduced faster, thereby avoiding the risk of overhanging the cliff.

If the grid unit corresponding to the three prediction points closest to the robot is the walked unit where the robot has walked normally, it is judged whether the grid unit corresponding to the fourth prediction point or the fifth prediction point is the cliff unit or the obstacle unit. Because the two prediction points are on both sides of the robot, even if they are dangerous units, it can pass through the middle, so it is not necessary to judge whether the two prediction points are dangerous units. When it is determined that one of the points is the cliff unit or the obstacle unit, the speed of the robot needs to be reduced to 0.7 times. Because there is usually more garbage on the edge of the obstacle or cliff, it needs to pass slowly to improve the cleaning effect.

If the grid units corresponding to the fourth prediction point and the fifth prediction point are walked units where the robot has walked normally, it is judged whether the sixth prediction point, the seventh prediction point or the eighth prediction point is the cliff unit or the obstacle unit. Because the three points are relatively far away from the robot, the purpose of prediction is to control the speed of the robot in advance. When it is detected that one is the cliff unit or the obstacle unit, the speed of the robot is reduced to 0.8 times. If no, the current walking mode of the robot is kept, and cleaning is continued.

The above embodiments are only sufficient disclosure rather than limitation of the disclosure, and any replacement of equivalent technical features based on the creative spirit of the disclosure without creative labor shall be regarded as the scope disclosed in this application.

What is claimed is:

1. A method for controlling robot walking, comprising the following steps:
   constructing a grid map based on grid units marked with a status;
   establishing a dynamic detection model with a current location of a robot as a reference point based on the grid map;
   predicting a forward path condition of the robot based on the dynamic detection model; and
   controlling a walking mode of the robot based on the prediction result,
   wherein establishing a dynamic detection model with a current location of a robot as a reference point comprises the following steps:
   constructing a first arc line with a first length as a radius by using the reference point as a circle center, and constructing a second arc line with a second length as a radius, wherein the first length is smaller than the second length;
   determining a region between the first arc line and the second arc line as a first prediction region;
   determining a region outside the second arc line as a second prediction region;
   determining a first prediction point, a second prediction point, a third prediction point, a fourth prediction point, and a fifth prediction point in the first prediction region with a current direction of robot walking as a reference direction, the first prediction point is located in the reference direction, a line connecting the first prediction point with the circle center and the reference direction form a first angle, the second prediction point and the fourth prediction point are located on one side of the first prediction point, a line connecting the second prediction point with the circle center and the line connecting the first prediction point with the circle center form a second angle, a line connecting the fourth prediction point with the circle center and the line connecting the first prediction point with the circle center form a fourth angle, the third prediction point and the fifth prediction point are located on the other side of the first prediction point, a line connecting the third prediction point with the circle center and the line connecting the first prediction point with the circle center form a third angle, and a line connecting the fifth prediction point with the circle center and the line connecting the first prediction point with the circle center form a fifth angle; and determining a sixth prediction point, a seventh prediction point and an eighth prediction point in the second prediction region with a current direction of robot walking as a reference direction, the sixth prediction point is located in the reference direction, a line connecting the sixth prediction point with the circle center and the reference direction form a sixth angle, the seventh prediction point is located on one side of the sixth prediction point, a line connecting the seventh prediction point with the circle center and the line connecting the sixth prediction point with the circle center form a seventh angle, the eighth prediction point is located on the other side of the sixth prediction point, and a line connecting the eighth prediction point with the circle center and the line connecting the sixth prediction point with the circle center form an eighth angle, wherein predicting a forward path condition of the robot based on the dynamic detection model comprises the following steps:

establishing an XY-axis local coordinate system with a current location of the robot as a local coordinate origin and a current direction as a local Y-axis direction;

converting local coordinates in the XY-axis local coordinate system where the first prediction point to the eighth prediction point are located into global coordinates in a corresponding XY-axis global coordinate system;

converting the global coordinates into grid coordinates; and determining statuses of grid units corresponding to the first prediction point to the eighth prediction point based on the grid coordinates and a grid map.

2. The method according to claim 1, wherein the first length is 1.2 times the radius of a robot body, and the second length is twice the radius of the robot body.

3. The method according to claim 1, wherein the first prediction point is located at an intersection of the first arc line and the reference direction; the second prediction point is located at an intersection of a first perpendicular line and a first parallel line; the third prediction point is located at an intersection of the first perpendicular line and a second parallel line; the fourth prediction point is located within a first line segment in a third parallel line; and the fifth prediction point is located within a second line segment in a fourth parallel line; and wherein the first perpendicular line is a perpendicular line that passes through the first prediction point and is perpendicular to the reference direction; the first parallel line is a parallel line that is located on one side of the reference direction, parallel to the reference direction and has a perpendicular distance from the reference direction by the radius of the robot body; the second parallel line is a parallel line that is located on the other side of the reference direction, parallel to the reference direction and has a perpendicular distance from the reference direction by the radius of the robot body; the third parallel line is a parallel line that is located on one side of the reference direction, parallel to the reference direction and has a perpendicular distance from the reference direction by the first length; the fourth parallel line is a parallel line that is located on the other side of the reference direction, parallel to the reference direction and has a perpendicular distance from the reference direction by the first length; the first line segment is a line segment from an intersection of the first perpendicular line and the third parallel line to an intersection of the second perpendicular line and the third parallel line; the second line segment is a line segment from the intersection of the first perpendicular line and the third parallel line to the intersection of the second perpendicular line and the third parallel line; the second perpendicular line is a perpendicular line that is located between the first prediction point and the circle center, perpendicular to the reference direction and has a shortest distance from the circle center by half of the radius of the robot body.

4. The method according to claim 3, wherein the sixth prediction point is located at an intersection of the second arc line and the reference direction; the seventh prediction point is located within a third line segment in a third perpendicular line; and the eighth prediction point is located within a fourth line segment in the third perpendicular line; and wherein the third perpendicular line is a perpendicular line that passes through the sixth prediction point and is perpendicular to the reference direction; the third line segment is a line segment from an intersection of the first parallel line and the third perpendicular line to an intersection of the fifth parallel line and the third perpendicular line; the fourth line segment is a line segment from an intersection of the second parallel line and the third perpendicular line to an intersection of the sixth parallel line and the third perpendicular line; the fifth parallel line is a parallel line that is located on one side of the reference direction, parallel to the reference direction and has a perpendicular distance from the reference direction by a sum of half of a difference obtained by subtracting the first length from the second length and the first length; the sixth parallel line is a parallel line that is located on the other side of the reference direction, parallel to the reference direction and has a perpendicular distance from the reference direction by a sum of half of the difference obtained by subtracting the first length from the second length and the first length.

5. The method according to claim 1, wherein converting local coordinates in the XY-axis local coordinate system where the first prediction point to the eighth prediction point are located into global coordinates in a corresponding XY-axis global coordinate system comprises the following steps:

determining the global coordinates of the current location of the robot in the XY-axis global coordinate system as (x, y);

determining an angle between the current direction of the robot and the Y axis in the XY-axis global coordinate system as θ;

determining the local coordinates of the first prediction point in the XY-axis local coordinate system as (x1, y1);

determining a distance between a projection point where the first prediction point is projected to the X axis in the XY-axis global coordinate system and a projection point where the current location of the robot is projected to the X axis in the XY-axis global coordinate system as $xr1=(x1*\cos\theta-y1*\sin\theta)$, and determining a distance between a projection point where the first prediction point is projected to the Y axis in the XY-axis global coordinate system and a projection point where the current location of the robot is projected to the Y axis in the XY-axis global coordinate system as $yr1=(x1*\sin\theta+y1*\cos\theta)$;

determining the global coordinates of the first prediction point as $(xw1=x+xr1, yw1=y+yr1)$;

determining the local coordinates of the second prediction point in the XY-axis local coordinate system as $(x2, y2)$;

determining a distance between a projection point where the second prediction point is projected to the X axis in the XY-axis global coordinate system and the projection point where the current location of the robot is projected to the X axis in the XY-axis global coordinate system as $xr2=(x2*\cos\theta-y2*\sin\theta)$, and determining a distance between a projection point where the second prediction point is projected to the Y axis in the XY-axis global coordinate system and the projection point where the current location of the robot is projected to the Y axis in the XY-axis global coordinate system as $yr2=(x2*\sin\theta+y2*\cos\theta)$;

determining the global coordinates of the second prediction point as $(xw2=x+xr2, yw2=y+yr2)$; and by analogy, completing the determination of the global coordinates of the eighth prediction point.

6. The method according to claim 5, wherein converting the global coordinates into grid coordinates comprises the following steps:

determining the grid unit as a square with a side length of L;

determining the grid coordinates of the first prediction point as $(xg1=xw1/L, yg1=yw1/L)$, and rounding the results of $xw1/L$ and $yw1/L$;

determining the grid coordinates of the second prediction point as $(xg2=xw2/L, yg2=yw2/L)$, and rounding the results of $xw2/L$ and $yw2/L$; and by analogy, completing the determination of the grid coordinates of the eighth prediction point.

7. The method according to claim 1, wherein controlling a walking mode of the robot based on the prediction result comprises the following steps:

judging whether a grid unit corresponding to the first prediction point, the second prediction point or the third prediction point is a dangerous unit;

if the grid unit corresponding to the first prediction point, the second prediction point or the third prediction point is the dangerous unit, controlling the robot to walk according to a first walking mode;

if the grid unit corresponding to the first prediction point, the second prediction point or the third prediction point is not the dangerous unit, judging whether the grid unit corresponding to the first prediction point, the second prediction point or the third prediction point is a cliff unit or an obstacle unit;

if the grid unit corresponding to the first prediction point, the second prediction point or the third prediction point is the cliff unit or the obstacle unit, controlling the robot to walk according to a second walking mode;

if the grid unit corresponding to the first prediction point, the second prediction point or the third prediction point is not the cliff unit or the obstacle unit, judging whether a grid unit corresponding to the fourth prediction point or the fifth prediction point is a cliff unit or an obstacle unit;

if the grid unit corresponding to the fourth prediction point or the fifth prediction point is a cliff unit or an obstacle unit, controlling the robot to walk according to a third walking mode;

if the grid unit corresponding to the fourth prediction point or the fifth prediction point is not the cliff unit or the obstacle unit, judging whether a grid unit corresponding to the sixth prediction point, the seventh prediction point or the eighth prediction point is a cliff unit or an obstacle unit;

if the grid unit corresponding to the sixth prediction point, the seventh prediction point or the eighth prediction point is the cliff unit or the obstacle unit, controlling the robot to walk according to a fourth walking mode; and if the grid unit corresponding to the sixth prediction point, the seventh prediction point or the eighth prediction point is not the cliff unit or the obstacle unit, keeping a current walking mode of the robot, wherein the dangerous unit is a grid unit where the robot detects a jam or slip, the obstacle unit is a grid unit where the robot detects an obstacle, and the cliff unit is a grid unit where the robot detects a cliff.

8. The method according to claim 7, wherein controlling the robot to walk according to a first walking mode comprises the following steps: controlling the robot to stop walking; judging whether the robot is in a '吕'-shaped walking phase; if yes, controlling the robot to turn around; if no, determining that the robot is in the phase of walking sidewise, and controlling the robot to continue to walk sidewise after bypassing the dangerous unit.

9. The method according to claim 7, wherein controlling the robot to walk according to a second walking mode comprises the following steps: if it is determined that the grid unit is an obstacle unit, controlling the robot to reduce the walking speed by a first proportion; if it is determined that the grid unit is a cliff unit, controlling the robot to reduce the walking speed by a second proportion.

10. The method according to claim 7, wherein controlling the robot to walk according to a third walking mode comprises the following steps: controlling the robot to reduce the walking speed by a third proportion.

11. The method according to claim 7, wherein controlling the robot to walk according to a fourth walking mode comprises the following steps: controlling the robot to reduce the walking speed by a fourth proportion.

* * * * *